Oct. 8, 1929.  J. A. CALLANT  1,730,803
DEMOUNTABLE RIM
Filed Jan. 13, 1928  3 Sheets-Sheet 1

WITNESSES

Inventor
JOHN A. CALLANT
By Irving L. McEathran
Attorney

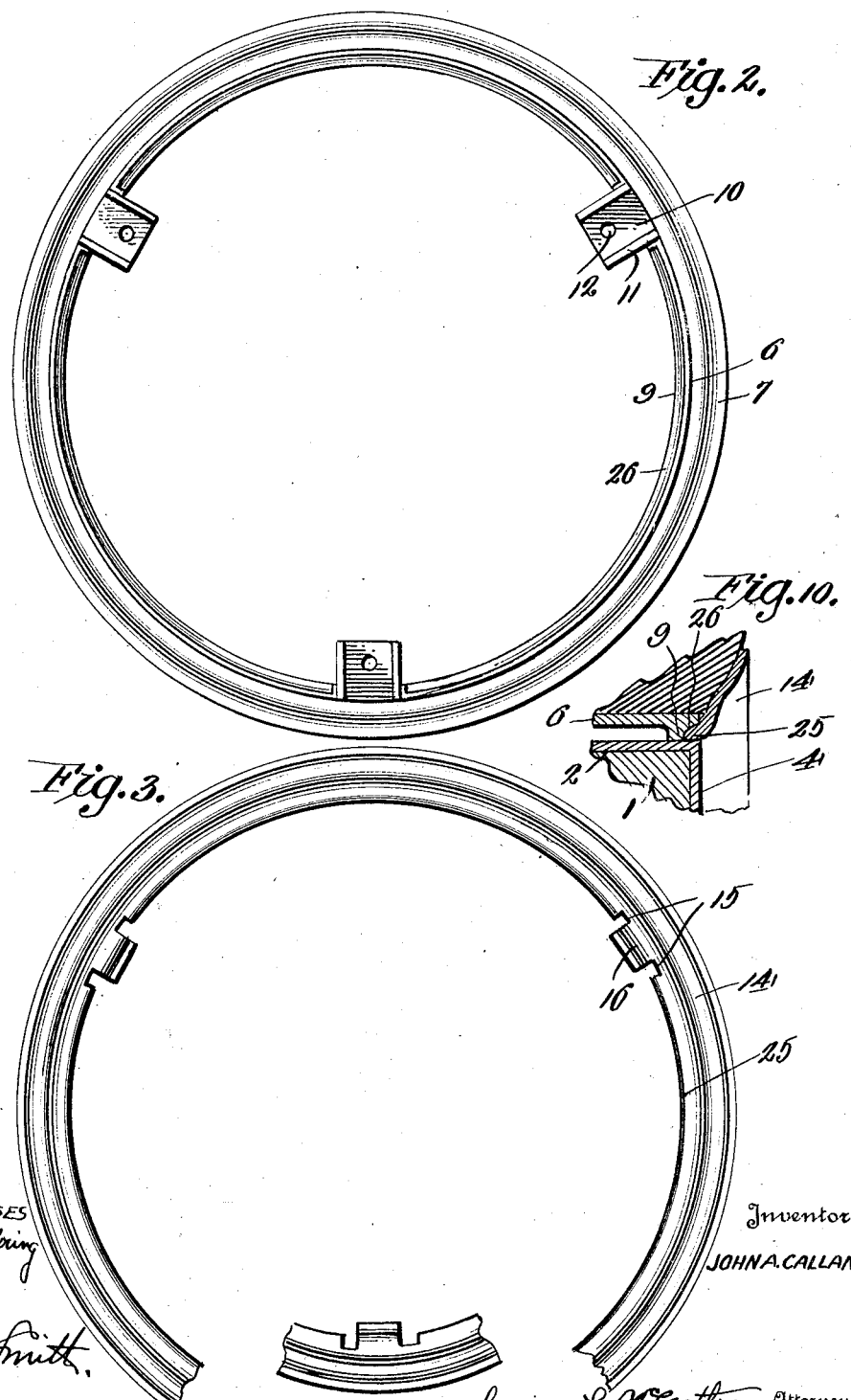

Oct. 8, 1929.　　　J. A. CALLANT　　　1,730,803
DEMOUNTABLE RIM
Filed Jan. 13, 1928　　　3 Sheets-Sheet 3
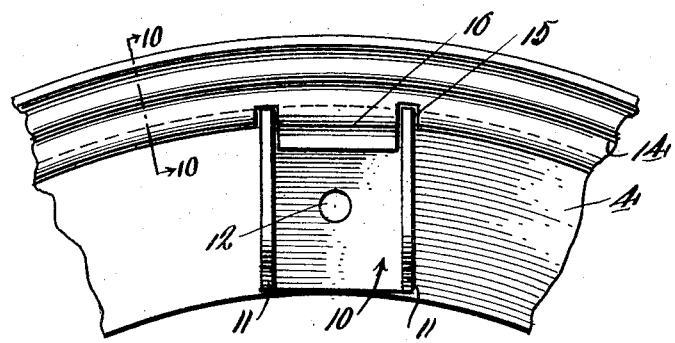
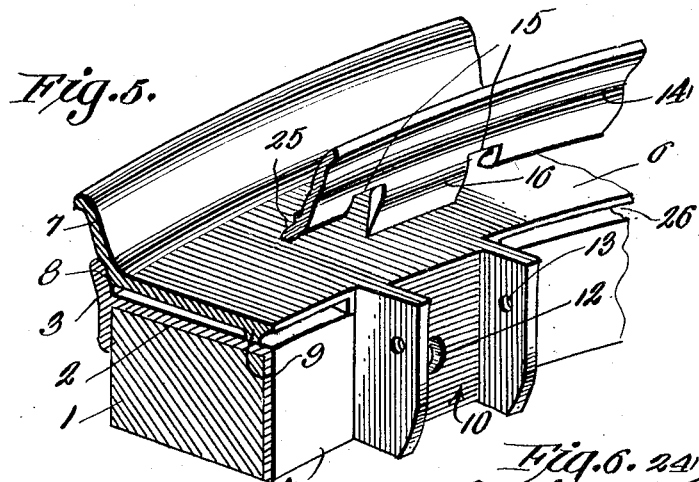
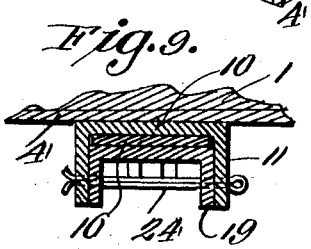 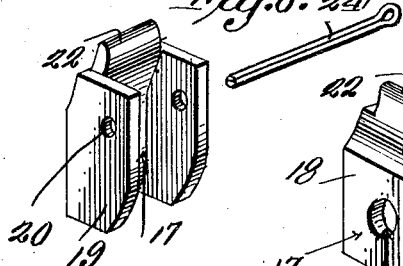 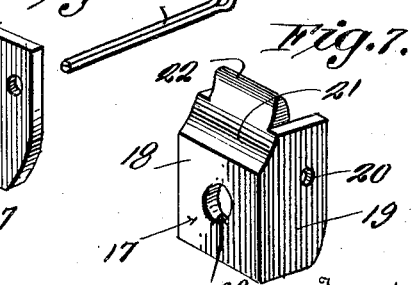
Inventor
JOHN A. CALLANT Patented Oct. 8, 1929

1,730,803

UNITED STATES PATENT OFFICE

JOHN A. CALLANT, OF SPENCER, SOUTH DAKOTA

DEMOUNTABLE RIM

Application filed January 13, 1928. Serial No. 246,526.

This invention relates to improvements in demountable rims for automobile wheels and has as one of its objects to provide a demountable rim so constructed as to be adapted to support a fully inflated tire and casing when carried upon the automobile as a spare, the construction being such as to adapt the rim, with the tire thereon, to be readily removed from the tire rack and readily applied to the felly band of the automobile wheel without the necessity of partly deflating the tire or in any way disturbing the locking means for the sections of the rim.

Another object of the invention is to provide a demountable rim so constructed that where it is necessary or desirable to change a tire on a wheel of an automobile, without removing or changing the rim, as well as the tire, this may be readily accomplished and without the necessity of removing the rim of the invention from the wheel.

Another object of the invention is to provide a demountable rim so constructed that the same may be readily employed upon practically any construction of automobile wheel now in general use without any change in the construction of the wheel or any alteration in the arrangement of the component parts of the wheel felly.

While the accompanying drawings and the description which is to follow, constitute a disclosure of the preferred embodiment of the invention, it will be understood that various changes may be made within the scope of what is claimed.

In the accompanying drawings:

Figure 2 is a view in side elevation of the main section of the rim;

Figure 3 is a similar view illustrating the removable section of the rim;

Figure 4 is a fragmentary detail side elevation of a portion of the two rim sections, assembled;

Figure 5 is a fragmentary group perspective view of the rim sections relatively separated;

Figure 6 is a perspective view of one of the locking lugs of the rim, removed, the view looking at one side of the lug and illustrating also a securing element adapted to be employed in connection with the lug;

Figure 7 is a view similar to Figure 6 looking at another side of the lug;

Figure 9 is a sectional view taken substantially on the line 9—9 of Figure 8 looking in the direction indicated by the arrows;

Figure 10 is a detail sectional view taken substantially on the line 10—10 of Figure 4 looking in the direction indicated by the arrows.

Figure 1:
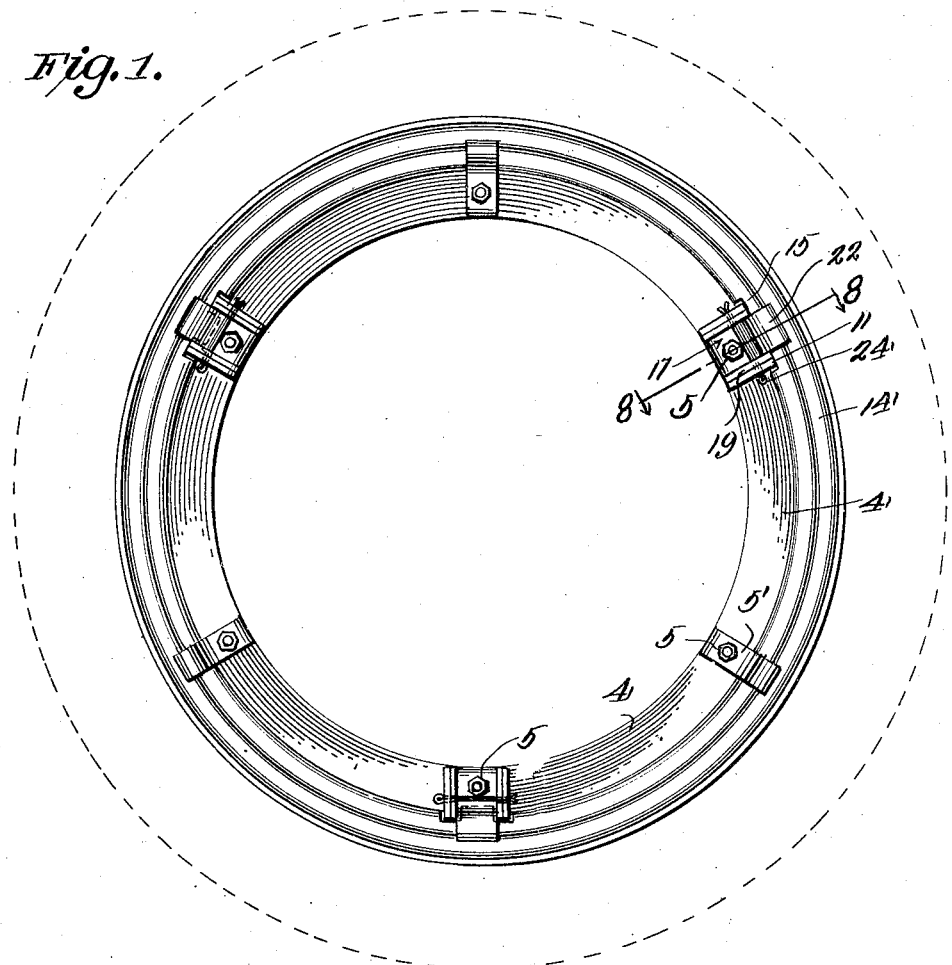
Figure 1 is a view in side elevation of the demountable rim embodying the invention, the same being illustrated as mounted upon a wheel felly.

In Figures 1, 4, 5, 8 and 9 of the drawings, which figures illustrate the rim, embodying the invention, applied to a wheel felly, the wheel felly is indicated by the numeral 1 and the usual felly band by the numeral 2, this felly band being provided at one side with the usual circumferential flange 3 a portion of which extends inwardly beside one face of the felly 1 and another portion of which projects outwardly to constitute an abutment for the main section of the rim embodying the invention, the felly band 2 being provided at its opposite side with the inwardly extending flange 4 which engages the other side of the felly 1. As is well known, the felly band 2 is secured upon the felly 1 by a plurality of circumferentially spaced bolts 5 which are secured through the felly 1 and through the flange 4 of the felly band, and ordinarily these bolts constitute means for securing in place the lugs 5′ which in turn clamp the ordinary demountable rim in place upon the felly band, and, in carrying out the invention, a greater or less number of these lugs may be employed and may be arranged alternately with respect to the securing lugs of the present invention as shown in Figure 1, or all of the lugs 5′ may be dispensed with and a total number of the lugs of the present invention, equal to the number of bolts, employed, either as found expedient.

The main section of the demountable rim embodying the invention is indicated in general by the numeral 6 and comprises an annular body of a diameter to adapt it to be relatively snugly fitted onto the felly band 2, the body being provided at one side with a circumscribing, continuous tire flange 7 which is shouldered at its outer side and adjacent its juncture with the body 6, as indicated by the numeral 8, so as to adapt it to be snugly disposed in contact with the outstanding portion of the flange 3 of the said felly band. The said body of the main section of the rim is preferably formed upon its inner side, at its opposite edge, with an annular, continuous shoulder 9 which rests upon the outer side of the felly band 2 at that side thereof from which the flange 4 extends, so that, due to the resiliency of the metal of which the section 6 is formed, its shoulder 8 will be caused to snugly fit the said outstanding portion of the flange 3 of the felly band when this section of the demountable rim is assembled with the felly band.

Figure 8:
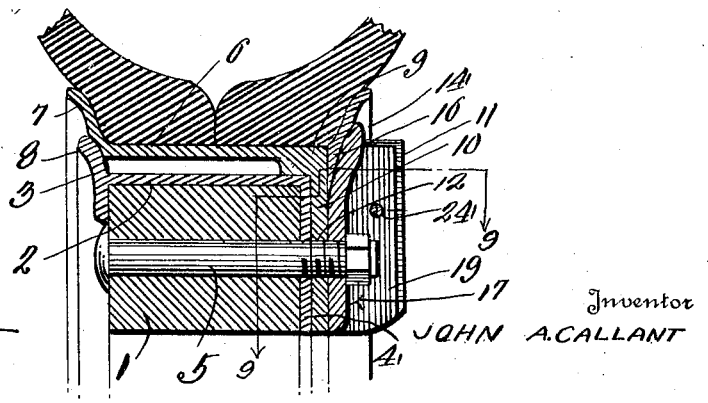
Figure 8 is a diametric sectional view in detail taken substantially on the line 8—8 of Figure 1 looking in the direction indicated by the arrows.

At intervals in its circumference, the annular body of the main rim section 6 is formed, at its lateral edge at which the shoulder 9 is located, with inwardly radially projecting lugs 10 each provided at its lateral edges with outstanding flanges 11, each lug being formed with an opening 12 to accommodate one of the bolts 5 as clearly shown in Figure 8 of the drawings. For a purpose to be presently explained, the flanges 11 of each lug 10 are formed with oppositely located, axially alined openings 13, these openings being preferably located outwardly beyond the opening 12.

The rim embodying the invention further comprises a section 14 in the nature of a continuous ring having the general cross sectional contour of the bead flange 7 of the main section 6 of the rim, the section 14 being designed to be assembled with the said section 6 and in a manner to engage and seat the other bead of the tire casing which is mounted upon the rim. In order that the section 14 may be firmly held against displacement and prevented from becoming rotatably displaced with respect to the section 6 and the felly band 2, the said section is formed at intervals in its circumference and in its inner edge with pairs of notches 15 the opposite side walls of which are designed to straddle the outer end edges of the flanges 11 of the lugs 10 in the manner clearly shown in Figures 1 and 4 of the drawings, the section 14 being formed, intermediate the notches 15 of each pair, with a substantially wedge shaped locking lip 16 which, in the assembled relation of the sections 6 and 14, projects radially inwardly between the flanges 11 of the respective lug 10 as clearly shown in Figures 8 and 9 of the drawings. At this point it will be evident that the abutment of the side walls of the notches 15 and the ends of the locking lip 16 against the outer and inner sides of the flanges 11, respectively, of the respective lugs 10 of the main rim section 6, will effectually prevent any rotative displacement of the section 14 with respect to the said section 6.

In connection with each of the lugs 10 there is employed a clamping lug which is clearly shown in Figures 6 and 7 of the drawings and indicated in general by the numeral 17, this lug comprising a body portion 18 and spaced flanges 19 which project from the outer face of the body portion 18 in parallel planes with respect to each other, the flanges 19 being so spaced as to adapt the lug 17 to be fitted snugly between the flanges 11 of the respective lugs 10 as clearly shown in Figures 1, 8 and 9 of the drawings. The flanges 19 are formed with openings 20 which are designed to register with the openings 13 in the flanges 11, for a purpose to be presently explained, and the outer end of the body 18 of each lug 17 is formed with a shoulder 21 which is of a contour to adapt it to fit snugly against the outer side of the respective lip 16 upon the section 14 of the rim, the body 18 of each lug being further provided, above this shoulder, with an upstanding lip 22 which is designed to engage snugly against the outer face of the section 14 as clearly shown in Figure 8 of the drawings. The body 18 of each lug 17 is formed with an opening 23 designed to register with the opening 12 in the lug 10 with which it is assembled, so that one end of the respective bolt 5 may be passed through these openings and a nut applied to said end of the bolt and tightened to lock the clamping lug 17 in place and in clamping engagement with the rim section 14 and its lip 16.

At this point it will be evident that after the section 6 of the rim has been fitted onto the felly band 2, and the tire casing with the inner tube therein is disposed upon the felly band, the clamping ring section 14 may be assembled with the section 6 with the lips 16 projecting between the flanges 11 of the respective lugs 10 of the said section 6, and the bolts 5 engaged through the felly 1 and the flange 4 of the felly band 2 and through the openings 12 and 23 of the lugs 10 and 17 respectively, the said lugs 17 being previously disposed between the flanges 11 of the respective lugs 10 and with their lips 22 in snug engagement with the outer face of the rim section 14. The nuts may then be threaded onto the ends of the respective bolts and tightened to bind against the outer faces of the bodies 18 of the lugs 17 or, if the tire is to be employed as a spare, the rim sections 6 and 14 may be assembled in the manner above outlined and the clamping lugs 17 assembled therewith and cotter pins 24 fitted through the registering openings 13 and 20 in the flanges 11 and 19 of the lugs 10 and 17 respectively. In this simple manner, therefore, an inflated tire may be supported upon the rim without the rim being actually mounted upon the felly band, and it will be evident that the clamping lugs 17 will be held by the cotter pins 24, assembled with the lugs 10 of the rim section 6 in a manner to securely retain in place the clamping ring section 14 of the rim. It will also be understood at this point that the rim and tire supported thereby may be readily removed from and mounted upon the felly band 2 of the vehicle wheel without disturbing the arrangement of the tire upon the rim and it will also be understood that, if desired, the cotter pins 24, or any other fastening elements which may be employed for insertion through the openings 13 and 20 in the flanges 11 and 19 of the lugs 10 and 17, may be permitted to remain in place after bolts have been fitted through the openings 12 and 23 in the said lugs 10 and 17 and through the felly 1 and flange 4 of the felly band 2, or these fastening elements may be removed.

As illustrated in Figure 10 of the drawings, the rim section 14 is provided at its inner periphery and upon its inner side with an inwardly projecting bead or shoulder 25 which extends continuously thereof except at the points of location of the notches 15 and lips 16, and this bead or shoulder engages in a seat 26 which is formed in the portion 9 of the rim section 6, this seat 26 being of course interrupted at the points of location of the lugs 10. This will of course add to the stability of the structure and will likewise constitute means for preventing the entrance of dust and other foreign matter, although it will be understood that the shoulder or bead 25 serves this purpose even in the absence of the thickened portion or shoulder 9 of the said rim section 6.

Having thus described the invention, what I claim is:

1. A demountable rim comprising a main section having a tire-seating flange at one side and a series of lugs at its opposite side, each of said lugs having a pair of outwardly projecting lateral flanges, a section comprising a tire-seating ring disposed against the last mentioned side of the main section and having a series of lips engaged against the lugs of the first mentioned section and between the flanges of said lugs, a plurality of clamping lugs assembled with the lugs of the first mentioned section between the flanges thereof and binding against the lips of the second mentioned section, and means securing the last mentioned lugs to the first mentioned lugs.

2. A demountable rim comprising a main section having a tire-seating flange at one side and a series of lugs at its opposite side, each of said lugs being provided with outstanding lateral marginal flanges and with an opening in its body portion intermediate the flanges, a section comprising a tire-seating rim disposed against the last mentioned side of the main section and having a series of lips engaged against the lugs of the first mentioned section and between the flanges thereof, the inner edge of the said tire-seating ring of the second mentioned section being provided with notches at the opposite ends of each of its lips to accommodate the outer edge portions of the flanges of the lugs of the first mentioned section, the said lips being substantially wedge shaped in cross section, and a clamping lug assembled with each of the lugs of the first mentioned section and comprising a body having an opening for registration with the opening in the respective lug of the first mentioned section and side flanges fitting between the side flanges of the said respective lugs of the first mentioned section and a clamping lip at the outer end of the body for clamping engagement against the lip upon the second mentioned section.

3. A demountable rim comprising a main section having a tire-seating flange at one side and a series of lugs at its opposite side, each of said lugs being provided with outstanding lateral marginal flanges and with an opening in its body portion intermediate the flanges, a section comprising a tire-seating rim disposed against the last mentioned side of the main section and having a series of lips engaged against the lugs of the first mentioned section and between the flanges thereof, the inner edge of the said tire-seating ring of the second mentioned section being provided with notches at the opposite ends of each of its lips to accommodate the outer edge portions of the flanges of the lugs of the first mentioned section, the said lips being substantially wedge shaped in cross section, and a clamping lug assembled with each of the lugs of the first mentioned section and comprising a body having an opening for registration with the opening in the respective lug of the first mentioned section and side flanges fitting between the side flanges of the said respective lugs of the first mentioned section and a clamping lip at the outer end of the body for clamping engagement against the lip upon the second mentioned section, the flanges of the lugs upon the first mentioned section and the flanges of the clamping lugs being provided with registering openings, and a fastening element removably fitted through said openings.

In testimony whereof I affix my signature.

JOHN A. CALLANT.